(12) United States Patent
Barwicz et al.

(10) Patent No.: US 9,720,188 B2
(45) Date of Patent: Aug. 1, 2017

(54) CONNECTING MID-BOARD OPTICAL MODULES

(71) Applicants: International Business Machines Corporation, Armonk, NY (US); US Conec Ltd., Hickory, NC (US)

(72) Inventors: Tymon Barwicz, Yorktown Heights, NY (US); Jerome Bougie, Bromont (CA); Darrell Childers, Hickory, NC (US); Paul Francis Fortier, Richelieu (CA); Alexander Janta-Polczynski, Shefford (CA); Stephan L. Martel, Bromont (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/985,492

(22) Filed: Dec. 31, 2015

(65) Prior Publication Data

US 2017/0192181 A1    Jul. 6, 2017

(51) Int. Cl.
*G02B 6/38*    (2006.01)
*G02B 6/30*    (2006.01)

(52) U.S. Cl.
CPC ............ *G02B 6/3893* (2013.01); *G02B 6/30* (2013.01); *G02B 6/3885* (2013.01); *G02B 6/3898* (2013.01)

(58) Field of Classification Search
None
See application file for complete search history.

(56) References Cited

U.S. PATENT DOCUMENTS

| 6,471,414 | B2 | 10/2002 | Carberry et al. |
| 7,373,031 | B2 | 5/2008 | Wang et al. |
| 8,104,973 | B2 | 1/2012 | Howard et al. |
| 8,195,017 | B2 * | 6/2012 | Kaneshiro ............ G02B 6/4201 385/14 |

(Continued)

FOREIGN PATENT DOCUMENTS

CN    204215073    3/2015

OTHER PUBLICATIONS

U.S. Appl. No. 14/870,176, filed on Sep. 30, 2015.

(Continued)

*Primary Examiner* — Tina Wong
(74) *Attorney, Agent, or Firm* — Fleit Gibbons Gutman Bongini Bianco PL; Gary Winer

(57) ABSTRACT

A clip connects two ferrules together, without a housing, to form a fiber optic connection. The clip has proximal and distal ends which define, and the clip has arms extending along the longitudinal axis to hold a cable-side ferrule in connection with fixed ferrule connected to a photonic module or die. The arms form an opening through which the cable-side ferrule is passed for connecting to the fixed ferrule. The arms have resilient bends forming a spring that can be resiliently extended along the longitudinal axis. The arms have a contact area at their ends which grasp the end of the cable-sided ferrule. The arms resiliently retract to compress the cable-sided ferrule towards the fixed ferrule with a predetermined force. The clip is positioned with respect to the circuit board using a pick and place system. The clip is not taller than either ferrule portion, enabling a limited vertical clearance.

19 Claims, 3 Drawing Sheets

(56) References Cited

U.S. PATENT DOCUMENTS

| | | | |
|---|---|---|---|
| 8,240,925 B2* | 8/2012 | Wu | G02B 6/32 |
| | | | 385/71 |
| 8,463,098 B2 | 6/2013 | Khadar | |
| 8,478,094 B2* | 7/2013 | Hsu | G02B 6/4214 |
| | | | 385/47 |
| 8,500,339 B2 | 8/2013 | Lee | |
| 8,534,927 B1 | 9/2013 | Barwicz et al. | |
| 8,545,108 B1 | 10/2013 | Barwicz et al. | |
| 8,678,667 B2* | 3/2014 | Koreeda | G02B 6/3882 |
| | | | 385/59 |
| 8,998,505 B2 | 4/2015 | Motofuji | |
| 9,285,548 B2* | 3/2016 | Lin | G02B 6/3825 |
| 9,297,967 B2* | 3/2016 | Rosenberg | G02B 6/4292 |
| 9,453,975 B2* | 9/2016 | Akieda | G02B 6/3879 |
| 2006/0067631 A1* | 3/2006 | Wang | G02B 6/4292 |
| | | | 385/92 |
| 2008/0226228 A1* | 9/2008 | Tamura | G02B 6/4214 |
| | | | 385/33 |
| 2009/0245736 A1* | 10/2009 | Ahadian | G02B 6/4292 |
| | | | 385/92 |
| 2010/0008630 A1* | 1/2010 | Marrapode | G02B 6/4292 |
| | | | 385/78 |
| 2013/0216190 A1* | 8/2013 | Haley | G02B 6/4292 |
| | | | 385/79 |
| 2014/0233893 A1 | 8/2014 | Mei et al. | |
| 2014/0270652 A1 | 9/2014 | Barwicz et al. | |
| 2015/0185423 A1* | 7/2015 | Matsui | G02B 6/389 |
| | | | 385/77 |

OTHER PUBLICATIONS

Wikipedia, "Optical Fiber Connector", https://en.wikipedia.org/wiki/Optical_fiber_connector, last visited on Jan. 8, 2016, pp. 1-10.

* cited by examiner

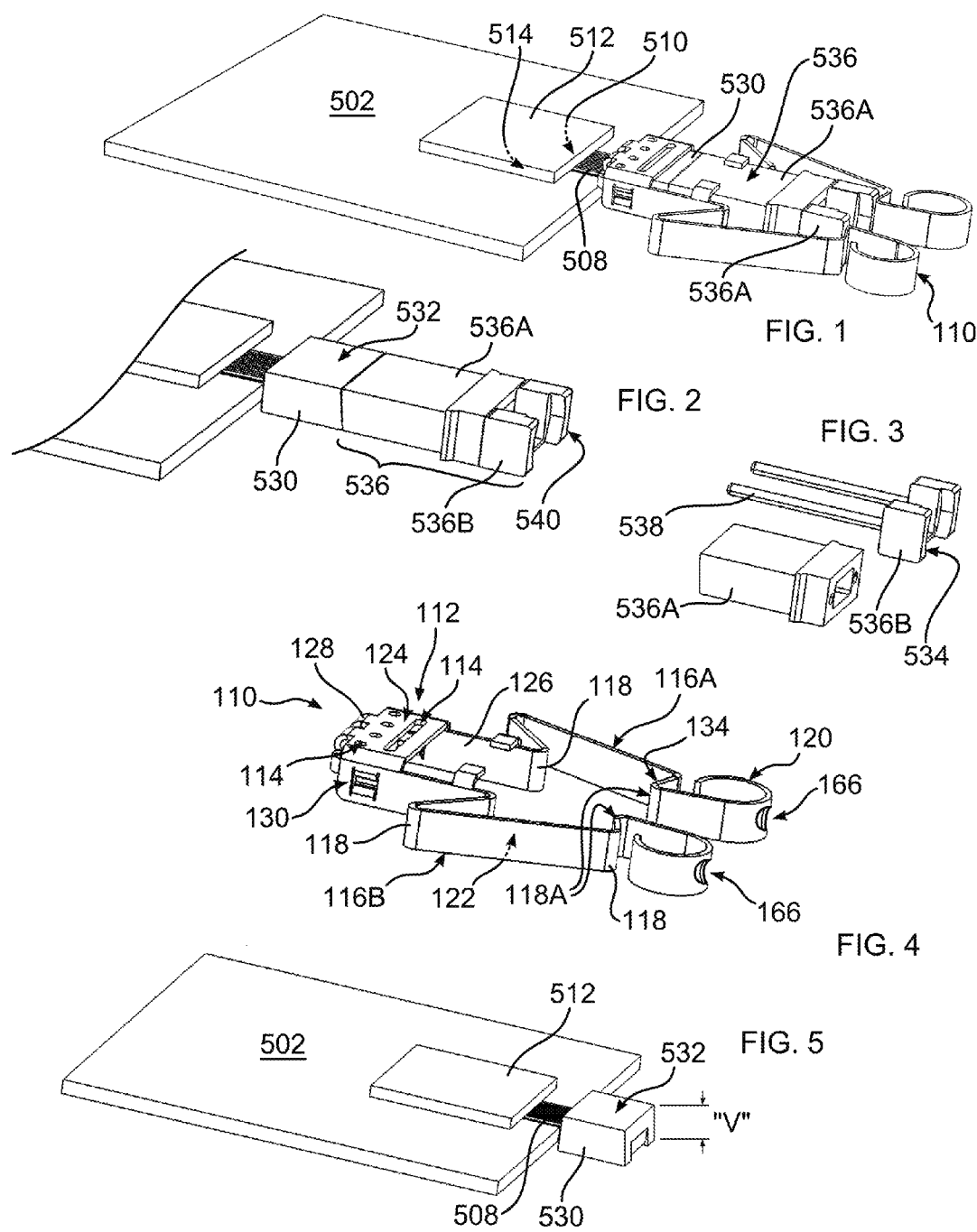

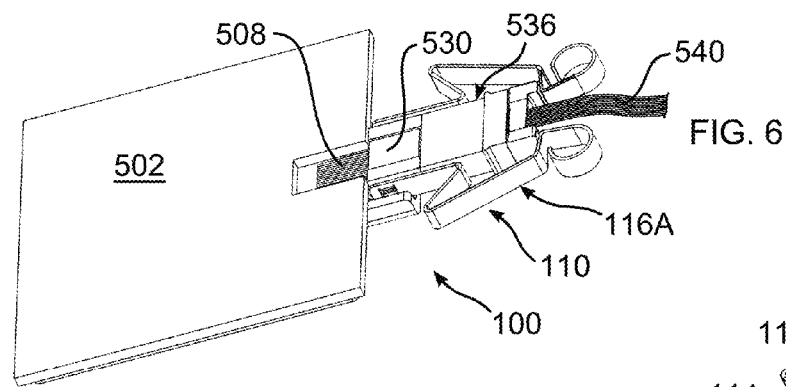
FIG. 6
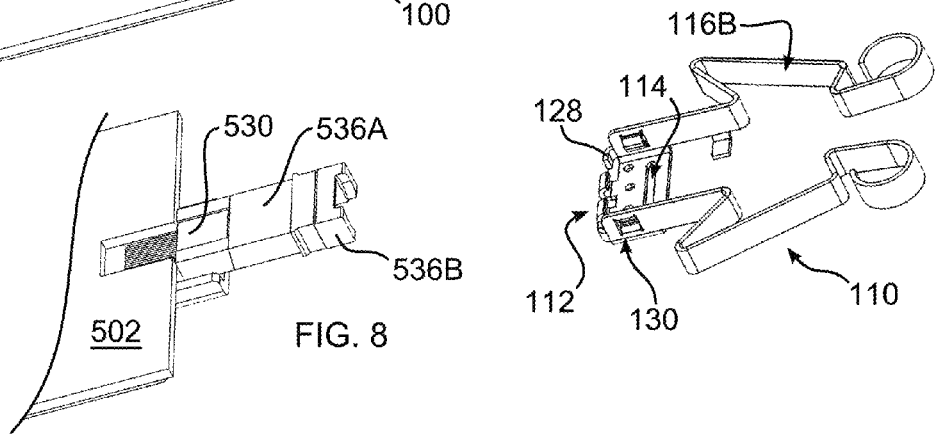
FIG. 7
FIG. 8
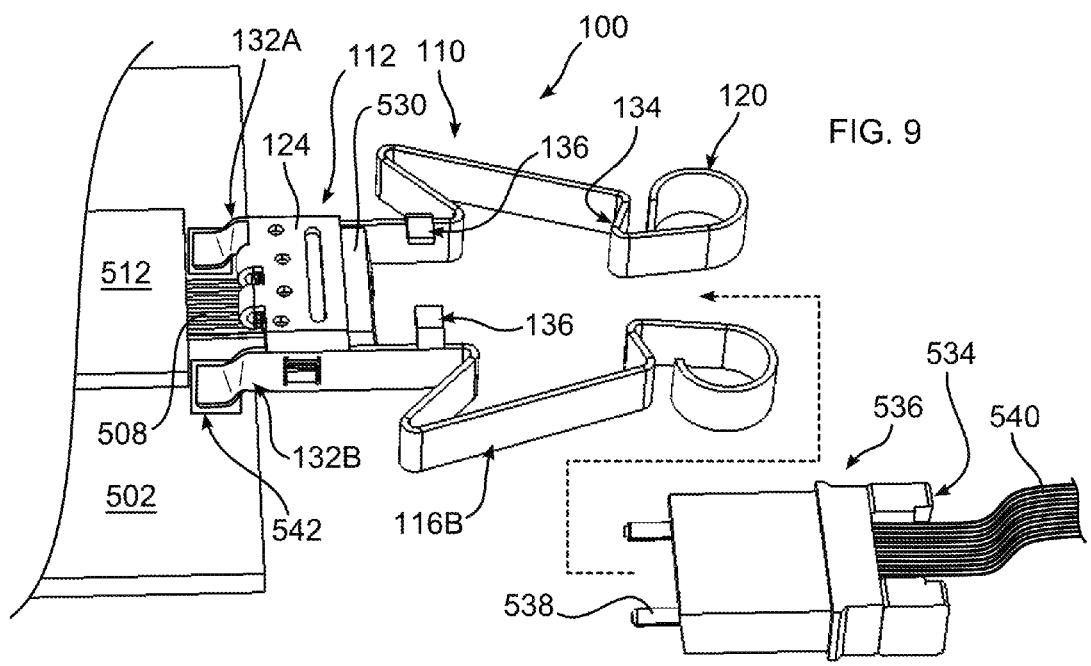
FIG. 9

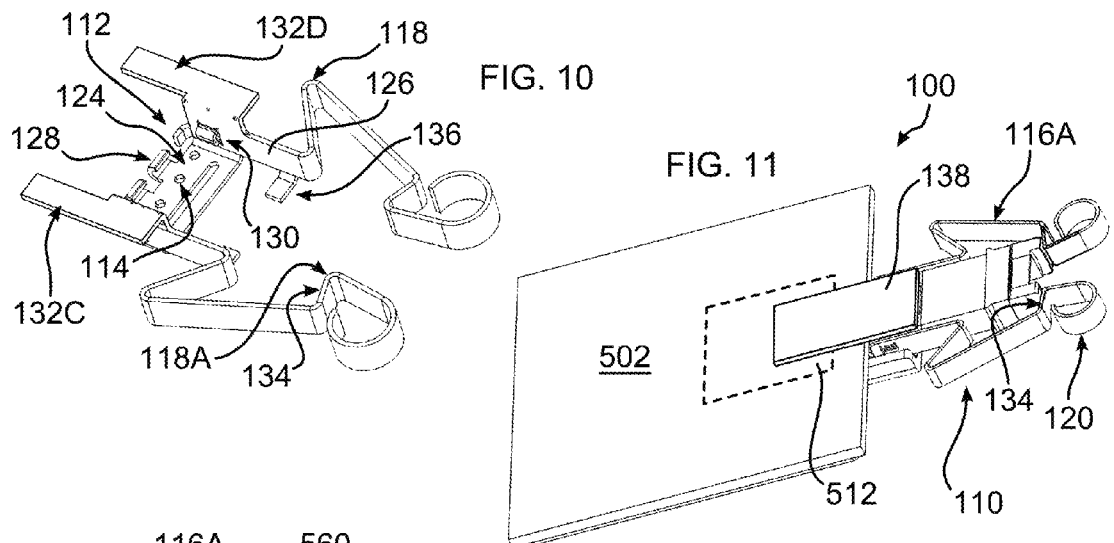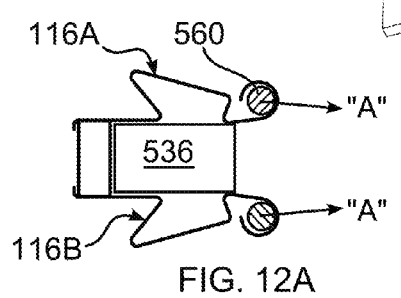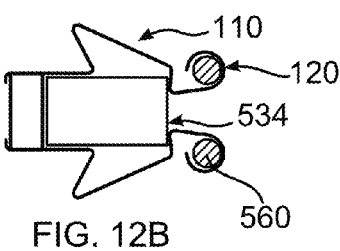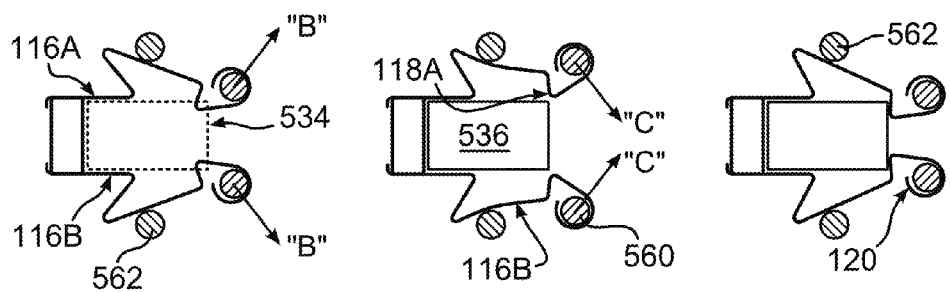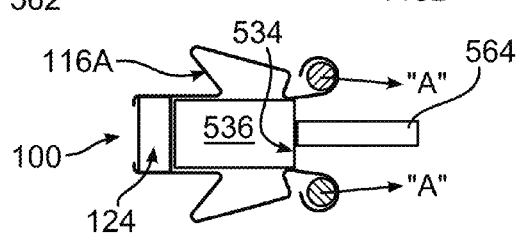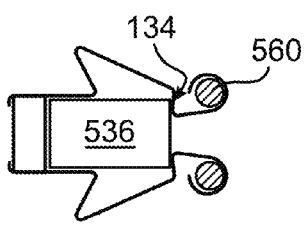

CONNECTING MID-BOARD OPTICAL MODULES

FIELD OF THE DISCLOSURE

The present disclosure generally relates to connecting mid-board optical modules, and more particularly to a low profile connection with strain relief and without a housing.

BACKGROUND OF THE DISCLOSURE

Mid board optical modules (MBOs) enable moving optical I/O connections from a system faceplate directly onto a printed circuit board (PCB), enabling higher throughput and improved reliability.

US CONEC of North Carolina, USA, manufactures "durable, composite, Polyphenylene Sulfide (PPS) based thermoplastic ferrules available with up to 72 fiber holes that terminate 125 micrometer optical fibers. The alignment mechanism consists of two stainless steel guide pins that fit into precisely molded alignment holes. The ferrules are used in conjunction with US Conec's industry hailed, MTP® brand, MPO type connectors; however, they are also suitable for custom designed passive or active fiber coupling packages. Fiber is secured to the ferrules with an optical connector grade thermal cure epoxy and can be polished with a variety of commercially available batch connector polishing machines . . . "

US CONEC additionally manufactures connector housings that provide quick connection for up to 72 optical fibers. Connection integrity is provided by adapter latches which are locked into place on the connector plug by a spring loaded sliding and locking mechanism. Precision alignment is achieved with guide pins combined with the tightly controlled guide pin holes on MT ferrules. Removable housings allow for quick change of gender, interferometry or connector re-polishing. US Conec's MTP brand connector components are fully compliant with IEC Standard 61754-7 and TIA 604-5—Type MPO." If the connector is latched to the adapter, the ferrule endface may be cleaned through the opposite side of the adapter. A connector not attached to an adapter may also be easily cleaned with the housing in place. (see http://www.usconec.com).

SUMMARY OF THE DISCLOSURE

In an embodiment of the disclosure, a device for securing two mating fiber optic ferrule portions together, the ferrule portions includes a fixed ferrule connected to a photonic die and a mating cable-side ferrule connected to an optical fiber cable, the device including a clip having a proximal end and a distal end defining a longitudinal axis extending therebetween, the clip including a plurality of arms extending in a first direction along the longitudinal axis, the arms defining an open center area therebetween sized to admit passage of the cable-side ferrule, each arm including (a) a plurality of resilient bends, the arm thereby forming a spring extensible along the longitudinal axis, and (b) a contact area shaped to be engageable with an end portion of the cable-side ferrule whereby the resilient bends are operative to compress the cable-side ferrule towards the fixed ferrule when the cable and fixed ferrules are mated; and a clip body located at the proximal end of the clip, the arms connected to the clip body, the clip body sized to position the arms on opposing sides of the fixed ferrule, the clip body connected to the fixed ferrule.

In another embodiment of the disclosure, a system for communicating a light signal with a cable-side ferrule connected to an optical fiber cable, the system includes a photonic die including optical waveguiding structures; a fixed ferrule mateable with the cable-side ferrule, the fixed ferrule connected to the photonic die through the optical waveguiding structures and configured to connect light signals between the cable-side ferrule and the photonic die, when the cable-side ferrule is mated with the fixed ferrule; and a clip having a proximal end and a distal end defining a longitudinal axis extending therebetween, the clip including a plurality of arms extending along the longitudinal axis, the arms defining an open center area therebetween sized to admit passage of the cable ferrule, arms including (a) a plurality of resilient bends, the arm thereby forming a spring extensible along the longitudinal axis, and (b) a contact area extending towards the open center area to be engageable with an end of the cable ferrule whereby the resilient bends are operative to compress the cable ferrule towards the fixed ferrule when the cable and fixed ferrules are mated. a clip body at the proximal end of the clip, the plurality of arms connected to the clip body, the clip body sized to position the arms with respect to the fixed ferrule.

In a further embodiment of the disclosure, a method of fabricating a connector for connecting two mating fiber optic ferrule portions including a fixed ferrule portion and a cable-side ferrule portion, comprises attaching a clip to the fixed ferrule portion, the clip having a proximal end and a distal end defining a longitudinal axis extending therebetween, the clip including a plurality of arms extending in a first direction along the longitudinal axis, the arms defining an open center area therebetween sized to admit passage of a mating ferrule portion connected to a fiber optic cable, each arm including (a) a plurality of resilient bends, the arm thereby forming a spring extensible along the longitudinal axis, and (b) a contact area extending towards the open center area to be engageable with an end of the ferrule portion connected to a fiber optic cable, whereby the resilient bends are operative to compress both mating ferrule portions together when the ferrule portions are mated; and a clip body at the proximal end of the clip, the arms connected to opposite sides of the clip body, the clip body sized to position the arms with respect to the fixed ferrule.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 1 depicts a top view of a circuit board with an attached clip of the disclosure, the clip connected to a board-side fixed ferrule, the clip engaging and securing a cable-side ferrule in mating conformity to the fixed ferrule;

FIG. 2 depicts a view of the mated fixed and cable-side ferrules of FIG. 1, without showing the clip;

FIG. 3 depicts one embodiment of a cable-side ferrule;

FIG. 4 depicts a view of the clip of FIG. 1, illustrating a variation with end facing tool engagement apertures;

FIG. 5 depicts the board and fixed ferrule of FIG. 1;

FIG. 6 depicts a bottom view of the circuit board, ferrules, and clip of FIG. 1;

FIG. 7 depicts a bottom view of the clip of FIG. 1;

FIG. 8 depicts a bottom view of the board and ferrules of FIG. 2

FIG. 9 depicts an embodiment of a clip of the disclosure, the clip including extensions for attachment to the circuit board;

FIG. 10 depicts an embodiment of a clip of the disclosure, the clip including alternative extensions for attachment to the circuit board, the attachments formed by folded portions of the clip;

FIG. 11 depicts an alternative attachment of the clip of FIG. 1 to the circuit board, using a brace plate;

FIGS. 12A-12B depict attaching the clip of FIG. 1 to a cable-side ferrule using a tool;

FIGS. 13A-13C depict attaching the clip of FIG. 1 to a cable-side ferrule using a tool and fixed pins; and FIGS. 14A-14B depict attaching the clip of FIG. 1 to a cable-side ferrule using a tool having a brace bar.

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

With reference to the figures, the disclosure provides a novel connection for securing connections to a photonic chip and particularly for the assembly of microelectronic, optoelectronic and photonic components. A connection system 100 of the disclosure provides for securing and preventing separation of a connection between two or more components, for example mating ferrule halves, as well as providing strain relief and resistance to out of plane misalignment. System 100 can further be provided with a maximum vertical dimension "V" that is not substantially greater than a vertical dimension of the components that system 100 is securing.

While an MT style standard or other style ferrule 530/536 is illustrated in the figures, the system 100 of the disclosure can be used to join and secure a wide variety of electrical or optical ferrules which are currently known or are hereinafter developed, as will be explained further elsewhere herein. While the disclosure illustrates mating optical ferrules, system 100 can be used to secure connections relying on electron flow in a similar manner.

With reference to FIGS. 1-8, an MT style ferrule termination is illustrated, which includes mating halves 530/536 which are mutually connectable to enable transmission of a light signal therethrough. The ferrule halves 530 and 536 include light guiding structures which are not detailed herein, but which are well known, and which transfer light from a fiber optic cable 540 (illustrated in FIGS. 6 and 9) to the light guiding structures in the chip device. Other styles of ferrules usable in accordance with the disclosure include LC, MU, SC and ST style connectors, although other styles exist or are to be developed which can also be used in accordance with the disclosure, as will be understood in view of the disclosure.

With reference to FIG. 1, a laminate substrate 502, supports a photonic device, chip, or die 512 that includes photonic waveguides. In an embodiment, the board can include a transceiver. A V-groove array 510 or other interface positioned on the underside of die 512 mates in a light transmitting manner to external optical waveguide ribbon 508, such as an optical fiber array or a polymer waveguide array defined on a polymer ribbon, which extend from die 512 to within a fixed mating board-side ferrule portion, or fixed ferrule 530. All of the die 512, waveguide ribbon 508, and fixed ferrule 530 can be assembled together during a manufacturing processing using a pick and place tool such as are used in the microelectronic industry, referred to hereinafter as a pick and place system, which can be of any known or hereinafter developed type. Photonic die 512 can be electrically connected to substrate 502 by any known means, including for example a flip-chip or other interface 514. The pick and place system can attach an MT or other style ferrule compatible fiber stub component, either built with a flexible polymer or fiber array, and can also install a clip 110 described elsewhere herein, in one assembly step, to the photonic die device.

As can be seen in FIG. 5, fixed ferrule has a height "V" which is typically less than several millimeters high, for example 1.25, 1.5, 2.5 mm and 3.0 mm, in commonly used 8, 12, 16 and 24 fiber styles. Such ferrules are typically contained within a jacket or housing, which significantly increases the size of the connector. As an example, a typical MT connector ferrule, for both 12 and 24 fiber connections, is 7 mm wide, 3 mm high, and 8 mm deep. A jacketed cable containing the ferrule can be 12.5 mm wide, 7.6 mm high, and 23 mm deep.

Substrate 502 is an interface between a photonic chip and a PCB. In many applications of substrate 502, substrate 502 is positioned on a PCB (printed circuit board, not shown). The PCB will generally extend beyond substrate 502, and would reduce the available clearance for a ferrule housing. The vertical space available is therefore generally limited by the thickness of substrate 502 and the thickness of a substrate 502 to PCB connection, such as BGA or LGA, as known in the art. The vertical clearance above substrate 502 can also be limited due to dimensional requirements of thermal sinks, or if it is desired to place boards in close overlying conformity to one another, or to otherwise install substrate 502 in a location where vertical clearance is extremely limited, and there is insufficient space for such a connector housing. As a result, in accordance with the disclosure, housings cannot be used in many applications where a connection would be advantageous, due to their substantial vertical extent. Further, housings can increase the cost of a product which requires many housings, and there are further costs and problems associated with accurately assembling such housings on many ferrules. Accordingly, the disclosure provides for forming a secure connection between mating ferrule portions, without increasing a height of the connection, and without requiring a housing/jacket for optical connections.

More particularly, clip 110 can be formed with a height no greater than the height of the mating ferrule portions, to avoid creating an additional clearance requirement. As a practical matter, there may be some gap, air space, or offset between boards, and therefore clip 110 can be taller than the ferrule portions, for example 0.1 to 15 mm taller depending on the installation, without imposing additional space requirements for boards 502. However, where needed, clip 110 can be no taller than the ferrules, while being able to carry out the functions detailed herein. Further, clip 110 can be less tall than mating ferrule portions, limited only to dimensions which provide sufficient strength, which may include a clip height that is substantially less than a height of the ferrule portions.

As can be seen in FIGS. 1-9, fixed ferrule 530 mates in light communication with a cable-side ferrule, hereinafter cable ferrule 536, which is connected to a fiber optic cable 540 (an example shown in FIG. 9). Cable 540 can be any type appropriate for a particular style of ferrule 530/536, including single- or multi-mode, and having any number of fibers, for example 1, 2, 12, 24, or 72 fibers. With reference to FIG. 3, in the example shown, cable ferrule includes two portions, a ferrule housing 536A and an alignment portion 536B. In some prior art ferrules, housing 536A is a dust or protective cover, and in other ferrules, it is a mating portion and supports the fibers to be aligned with fixed ferule 530. Alignment portion 536B is sometimes integrated into housing 536A, or can be separate, as shown. Pins 538 pass through corresponding apertures (also known as guide holes, not shown) in fixed ferrule 530, to mutually align fixed and cable ferrules 530, 536. To perform the alignment mating, male pins 538 can be either on the fixed ferrule face 530 or the cable ferrule 536 face.

In accordance with the disclosure, clip 110 provides resistance to unintended disconnection, pullout, or separation of ferrules 530, 536. Clip 110 includes a base 112 that is positioned in a fixed location with respect to a location of fixed ferrule 530. In an embodiment, base 112 is affixed directly to fixed ferrule 530, for example using an adhesive, although any other means of fastening can be used, including one or more threaded fasteners. To improve adhesion, and to provide an acceptable path for an overflow of adhesive, apertures 114 are provided through base 112 through which adhesive can pass. The location of apertures 114 is selected to ensure that glue/adhesive overflow does not interfere with light transmission. In an embodiment, adhesive can be applied on the top, sides, and if needed to the back of the fixed ferrule 530, advantageously avoiding a side where the optical face is exposed. In an embodiment, base 112 is formed from a plate 124.

Extending from base 112 are two resilient arms 116A and 116B, which include one or more shaped portions which can have the form, for example, of a coil, fold, or bend 118 which can be stretched to enable resilient expansion of each of arms 116A, 116B. In an embodiment, each arm includes a loop 120 which can be engaged by a tool, for example c-clip pliers or the like, to manipulate arms 116A, 116B.

In an embodiment, clip 110 is molded into fixed ferrule 530, to become integral therewith. For example, clip 110 can be placed into a mold into which the material of ferrule 530 is injected or poured. whether or not clip 110 and fixed ferrule 530 are co-molded, the separate components or the co-molded assembly can be assembled onto a circuit using pick and place equipment, and then used as otherwise described herein.

In the example embodiment, there are 4 bends which contribute towards the resiliency and extendability of arms 116A, 116B, whereby each arm 116A, 116B forms a spring extendible along a longitudinal axis extending from a proximal or board connecting side to a distal or open ended side of clip 110. In this manner, each of arms 116A, 116B can exert a clamping force between fixed ferrule 530 and cable ferrule 536. However, there could be greater or fewer bends, depending upon a composition and thickness of the material of arms 116A, 116B, the force desired to be exerted, an amount of extension required to form the connection to cable ferrule described herein, and other factures that would be understood by the skilled practitioner. A portion of clip 110 at the distal end has a contact area 134 shaped to engage a trailing end part, for example a trailing end shoulder 534, of cable ferrule 536. As such, contact areas 134 of each arm extend in a direction towards each other, and towards a centerline of clip 110, to be positionable over an end portion of cable ferrule 536. Contact area 134, in an embodiment, is limited to a bend 118A in arm 116A/116B. In the embodiment shown, arms 116A and 116B are positioned on opposing sides of clip 110, however there can be one arm, or the arms can be positioned asymmetrically, for example with one arm on a side, and another arm on a top surface, or there could be several arms, all cooperating to releasable secure cable ferrule 536.

Clip 110 is sized to have a height less than or equal to "V", in order to not increase a height requirement for substrate 502 with attached fiber cables. It is noted in this regard that, in FIG. 4, clip 110 is enlarged for clarity. Clip 110 is shaped to be readily manipulated by pick and place equipment as part of an overall manufacturing process for substrate 502 together with die 512 and fixed ferrule 530. For use with pick and place equipment, clips 110 can be provided on a supply reel connected to form a part of a pick and place system. Clip 110 is generally U-shaped with an open side 122, whereby clip 110 can be lowered by a robotic or automated handler into a position over fixed ferrule 530, to position plate 124 into contact with an upper surface 532 of fixed ferrule 530, to which clip 110 can be fastened. Side walls 126, bent prongs 128 and indents 130 further align clip 110 with respect to fixed ferrule 530.

Indents 130, in particular, ensure space between clip 110 and fixed ferrule 530, for the flow of adhesive, and can exert a clamping force upon fixed ferrule 530 to maintain a relative position of fixed ferrule 530 and clip 110 until such adhesive cures. In an embodiment, indents 130 can engage mating indents (not shown) which can be provided upon mating sides of fixed ferrule 530. Additionally, indents 130 can be grasped by the pick and place system.

With further reference to FIG. 9, cable ferrule 536 is inserted between arms 116A and 116B, and is engaged into mating contact with fixed ferrule 530. When cable ferrule 536 is fully inserted, loops 120 can be moved, as described further elsewhere herein, to resiliently stretch and elongate arms 116A and 116B at bends 118, 118A to enable a positioning of bends 118A and/or a contact area 134 at a distal portion of clip 110 into contact with trailing end shoulder 534 of cable ferrule 536. In an embodiment, contact area 134 is shaped to mate with a surface structure located at the trailing end shoulder 534 of cable ferrule 536. As plate 124 is fixed in relationship to fixed ferrule 530, the force applied by clip 110 is directed towards plate 124, driving ferrule portions 530 and 536 together. Pins 538 or other structure normally associated with mating ferrule portions can be used to help establish and maintain a correct alignment between ferrule portions 530, 536 as the pressure is applied.

Thus, clip 110 maintains an optical connection between fixed ferrule 530 and cable ferrule 536, and applies a force which squeezes them into mutual contact, advantageously applying a joining force specified by the manufacturer of the ferrules. In one example, this force load is targed to approximately 10 N with a force range of 1 to 50N, and commonly 6.5N to 15N, to accommodate components and assembly processes tolerances, but can be substantially greater or lesser depending upon the particular requirement of ferrule style and model being secured in accordance with the disclosure. FIGS. 1, 6, and 10 illustrate clip 110 securing mating ferrule portions 530 and 536 together, although for clarity, a cable extending from cable ferrule 536 is not illustrated in all figures.

While an MT style ferrule is illustrated, it should be understood that a wide variety of ferrules have a trailing end shoulder or other trailing structure which can be contacted by a distal portion of clip 110 in the manner described herein, to join mating ferrule portions. Arms 116A, 116B can have a sufficient number of bends, or bends of appropriate resiliency, whereby clip 110 exerts the required force over a wide range of displacement of loops 120 and contact area 134, compensating for variation in the size and position of ferrules 530, 536 and clip 110. A distal portion of clip 110 can be shaped to positively engage a cable ferrule which has a shape that is substantially different than is illustrated, for example a form that is not rectangular or square, wherein the shape of distal portion 110 has a mating or complementary shape to ensure a secure engagement.

Fixed ferrule 530 can be secured in a relative position with waveguide ribbon 508 and photonic die 512 by any of a variety of means, including brackets, braces, sleeves, struts, forms, or any other structure which can mechanically secure fixed ferrule 530 with respect to die 512 and substrate 502. As shown in FIGS. 9-11, in accordance with the disclosure, clip 110 is fabricated as a molded part, or as a stamping that is bent to form the structure shown and described. A molded part can be fabricated from a polymeric, resinous, or composite material, for example, and a stamping can be formed of metal, such as stainless steel, nitinol, or other durable material that is resilient when formed as shown and described. Other methods of manufacturing and material choices are possible, provided the resultant part has the properties described herein, and is not otherwise incompatible with an optoelectronic circuit as described.

In FIG. 9, arms 116A, 116B have extensions 132A, 132B which extended in a direction of substrate 502, and are bent at 90 degrees to lie flat upon substrate 502, where they can be attached using any known means, including using adhesive or fasteners. In an embodiment, metallic pads 542 can be provided upon substrate 502 to which extensions 132A, 132B can be soldered, whereby clip 110 can be positioned and affixed entirely within the pick and place manufacturing process without subsequent handling steps. Tabs or flanges 136 can be provided to align clip 110 with either or both of ferrule portions 530, 536, and to provide additional support and stability to clip 110 and the secured ferrule portions.

In FIG. 10, arm extensions 132C, 132D are bent at an angle of ninety degrees transverse to arms 116A, 116B, and extend to overlap substrate 502 when clip 110 is installed. Extensions 132C, 132D can be fabricated and attached in a similar manner as described for extensions 132A, 132B, and can be provided together with extensions 132A, 132B, to secure clip 110 to opposite sides of substrate 502, thereby preventing or reducing a possibility of arm extensions 132A-D from bending and causing clip 110 to becoming displaced with respect to substrate 502. In an embodiment, arm extensions 132C, 132D and a remainder of clip 110 are formed from a single stamping that is bent to form the structure shown in FIG. 10.

In FIG. 11, it may be seen that a brace plate 138 extends between substrate 502 and clip 110, and may be fastened to each using any known means, including glue/adhesive, fasteners, or soldering, for example. Plate 138 can be used cooperatively with other bracing structures, for example a brace structure on an opposite side of substrate 502, or with the arm extensions 132A-D described with respect to FIGS. 9 and 10. Brace plate 138 can be fabricated using a material that is selected to compensate for a coefficient of thermal expansion (CTE) of the materials to which it is attached, to avoid CTE mismatch due to thermal processes, and to reduce strain in the final package.

The attachment of clip 110 to substrate 502 can be sufficiently strong to withstand the pulling force required to install clip 110 onto cable ferrule 536, particularly if clip 110 is securely fastened to substrate 502 as described herein. In FIGS. 12A-12B, it can be seen that c-clip pliers or other tool which has tool ends 560 which can engage loops 120. The tool can then be used to first separate loops 120, whereby a cable ferrule can be inserted, and to then pull in the direction of arrows "A" to bend clip 110 as described herein to engage trailing end shoulder 534 of cable ferrule 536 with contact area 134. However, the connection between fixed ferrule 530 and the photonics device can be fragile and strain sensitive for performance, for example it can include a glued interface connection which should not be unduly stressed. Accordingly, as illustrated in FIGS. 13 and 14, it is possible to manipulate clip 110 while imparting a reduced pulling force to the connection between clip 110 and substrate 502.

It is noted that in the various embodiment described herein, loops 120 are moved laterally to operate clip 110, and can be opened, without requiring tools, during the insertion of a system ferrule/dust cover. Further, no additional vertical space is required for operation of clip 110. Additionally, loops 120 can be implemented as apertures 166 located at an end of each of arms 166A, 166B, as shown in FIG. 4. Apertures 166 can be accessed by inserting a tool end into each aperture 166 from a front side surface of clip 110, along a longitudinal axis extending from loops 120 toward plate 124. This avoids a need to insert a tool end into loop 120 from above or below clip 110, which may be difficult in certain applications due to limited space between boards 502, or between substrate 502 and other structures of the deployment environment. Apertures could form a keyed shape, for example include a slot, whereby a tool end could, for example, be inserted and rotated to engage one or both of arms 116A, 116B for pulling along the longitudinal axis. The trailing end portions of arms 116A, 116B can be shaped to specifically match a shape of the system ferrule type that needs to be secured.

In FIG. 13A, tool ends 560 move clip loops in the direction of arrows "B", bending arms 116A, 116B facilitating insertion of cable ferrule 536. Optionally, tool posts 562 can be used to help a particular arm bending motion. In FIG. 13B it can be seen that bend 118A, or a flat or other shaped portion forming a contact area 134, is provided to engage cable ferrule 536, and is aligned to engage trailing end shoulder 534. Moving tool ends 560 in the direction of arrows "C" positions contact areas 134 over trailing end shoulders 534, whereupon loops 120 can be disengaged, leaving clip 110 in place, all while exerting a reduced pulling force against parts connected to clip 110, such as substrate 502. In another embodiment, tool posts 562 can apply an inwards pressure along the length of arms 116A, 116B to bow arms 116A, 116B to facilitate removal of clip 110. Clip 110 is advantageously fabricated with a resilient material that can be flexed or stretched repeatedly in this manner, with consistent results, and which is resistant to breakage.

In FIG. 14A, loops are separated either by using tool ends 560, or by simply pushing loops 120 apart while inserting cable ferrule 536. Arms 116A, 116B can be shaped with a ramped portion whereby cable ferrule 536 slides against the ramped portion, for example an inner side of loops 120, to separate arms 116A, 116B as cable ferrule 536 is inserted. Next, a brace bar 564 is positioned against trailing edge shoulder 534, and is held in place to transfer a pulling force along clip arms 116A, 116B as the arms are extended. The bar maintains a position of clip 110 by transferring the pulling force into plate 124 or other portion of clip 110 that is attached to fixed ferrule 530, and then back through ferrule 536, thereby avoiding transferring a significant pulling force between clip 110 and substrate 502. Brace bar 564 can form part of a tool (not shown) that includes tool ends 560, enabling one handed operation of the tool.

Accordingly, the disclosure enables forming and maintaining a secure connection between mating ferrule components while enabling a vertical profile that is not taller than the ferrule connection. A system 100 of the disclosure can be assembled using standard high-throughput pick and place equipment, without necessitating an assembly which requires human intervention.

System 100 can be used to secure a connection of simplex, duplex, and ribbon ferrules, the ferrules fabricated with any material, for example stainless steel, a polymeric material, a composite material, or a ceramic material. For example, clip 110 can be shaped to extend laterally around, and to contact a trailing end shoulder of an MT, LC, SC, or MU ferrule of any known or hereinafter developed size. Clip 110 provides ready access to a face of fixed ferrule 530 for cleaning or inspection. In an embodiment, plate 124, as shown, does not obscure or cover the face of fixed ferrule 530 from access from above clip 110.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A device for securing two mating fiber optic ferrule portions together, the ferrule portions including a fixed ferrule connected to a photonic die and a mating cable-side ferrule connected to an optical fiber cable, the device including:
   a clip having a proximal end and a distal end defining a longitudinal axis extending therebetween, the clip including
      a plurality of arms extending in a first direction along the longitudinal axis, the arms defining an open center area therebetween sized to admit passage of the cable-side ferrule, each arm including
         (a) a plurality of resilient bends, the arm thereby forming a spring extensible along the longitudinal axis, and
         (b) a contact area shaped to be engageable with an end portion of the cable-side ferrule whereby the resilient bends are operative to compress the cable-side ferrule towards the fixed ferrule when the cable and fixed ferrules are mated; and
   a clip body located at the proximal end of the clip, the arms connected to the clip body, the clip body sized to position the arms on opposing sides of the fixed ferrule, the clip body aligned to the fixed ferrule, the clip body including one or more apertures to admit passage of and direct movement of excess adhesive applied between the clip and the fixed ferrule when the clip is adhered to the fixed ferrule.

2. The device of claim 1, further including a tool engaging shape proximate the contact area of each of the plurality of arms, the engaging shape engageable with a tool end, the engaging shape movable by the tool to connect each of the plurality of arms to the cable-side ferrule.

3. The device of claim 1, wherein the plurality of arms include two arms, the clip body being formed as a plate at the proximal end of the clip, the first and second arms connected to opposite sides of the plate, the plate sized to position the first and second arms on opposite sides of the fixed ferrule.

4. The device of claim 1, further including at least one attachment extension connected to the proximal end of the clip and extending in a second direction opposite to the first direction to be connected in a fixed position with respect to the photonic die.

5. A system for communicating a light signal with a cable-side ferrule connected to an optical fiber cable, the system including:
   a photonic die including optical waveguiding structures;
   a fixed ferrule mateable with the cable-side ferrule, the fixed ferrule connected to the photonic die through the optical waveguiding structures and configured to connect light signals between the cable-side ferrule and the photonic die, when the cable-side ferrule is mated with the fixed ferrule; and
   a clip having a proximal end and a distal end defining a longitudinal axis extending therebetween, the clip including
      a plurality of arms extending along the longitudinal axis, the arms defining an open center area therebetween sized to admit passage of the cable ferrule, arms including
         (a) a plurality of resilient bends, the arm thereby forming a spring extensible along the longitudinal axis, and
         (b) a contact area extending towards the open center area to be engageable with an end of the cable ferrule whereby the resilient bends are operative to compress the cable ferrule towards the fixed ferrule when the cable and fixed ferrules are mated,
      a clip body at the proximal end of the clip, the plurality of arms connected to the clip body, the clip body sized to position the arms with respect to the fixed ferrule, the clip forming a plate including one or more apertures to admit passage of and direct movement of excess adhesive applied between the plate and the fixed ferrule when the plate is adhered to the fixed ferrule.

6. The system of claim 5, the clip body formed as a plate at the proximal end of the clip, the first and second arms connected to opposite sides of the plate, the plate sized to position the first and second arms on opposite sides of the fixed ferrule.

7. The system of claim 5, further including an attachment extension affixed with respect to the photonics die and to the clip.

8. The system of claim 7, wherein the attachment extension includes two rigid extension members attached to opposite sides of a board to which the photonic die is connected.

9. The system of claim 7, wherein the attachment extension is attached to a laminate to which the photonic die is connected using at least one of solder, adhesive, and fastener.

10. The system of claim 5, wherein the photonic die is connected to a laminate, and the laminate is connected to a PCB, and wherein the signals are communicated from the photonics die to the PCB through the laminate.

11. The system of claim 5, wherein the fixed and cable-side ferrules are of a type selected from the group consisting of MT, LC, MU, SC and ST.

12. The system of claim 5, further including at least one of an engageable shape at the end of at least one of the plurality of arms at the distal end of the clip, the engageable shape connectable to a tool end of a tool.

13. The system of claim 5, wherein the clip has a height transverse to the longitudinal axis which is not substantially greater than a height of the fixed ferrule.

14. The system of claim 5, wherein the arms resiliently bend along one or more axes to exert a force between 3 and 15 N along the direction of the longitudinal axis.

15. The system of claim 5, wherein the arms are fabricated with at least one of metal and plastic.

16. The system of claim 5, further including one or more tabs extending from the clip, the tabs sized and positioned to engage the fixed ferrule and position the clip in a predetermined location with respect to the fixed ferrule.

17. The system of claim 5, the clip further including a shaped area at a distal end of each arm, the shaped area configured to engage a trailing end part of the cable-side ferrule, the shaped areas pulled, by resilient bending of their respective arms, towards the proximal end of the clip when the shaped areas are engaged with a trailing end part of the cable-side ferrule, to thereby urge the cable-side ferrule and the fixed ferrule together with a predetermined force.

18. A method of fabricating a connector for connecting two mating fiber optic ferrule portions including a fixed ferrule portion and a cable-side ferrule portion, comprising:
attaching a clip to the fixed ferrule portion, the clip having
a proximal end and a distal end defining a longitudinal axis extending therebetween, the clip including
a plurality of arms extending in a first direction along the longitudinal axis, the arms defining an open center area therebetween sized to admit passage of a mating ferrule portion connected to a fiber optic cable, each arm including
(a) a plurality of resilient bends, the arm thereby forming a spring extensible along the longitudinal axis, and
(b) a contact area extending towards the open center area to be engageable with an end of the ferrule portion connected to a fiber optic cable, whereby the resilient bends are operative to compress both mating ferrule portions together when the ferrule portions are mated; and
a clip body at the proximal end of the clip, the arms connected to opposite sides of the clip body, the clip body sized to position the arms with respect to the fixed ferrule, the clip body including one or more apertures to admit passage of and direct movement of excess adhesive applied between the clip and the fixed ferrule when the clip is adhered to the fixed ferrule.

19. The method of claim 18, wherein prior to attaching the clip, the clip is positioned with respect to the fixed ferrule component using a pick and place system.

* * * * *